United States Patent [19]

Brown, Jr. et al.

[11] 3,816,331

[45] June 11, 1974

[54] CONTINUOUS ENCAPSULATION AND DEVICE THEREFOR

[75] Inventors: George T. Brown, Jr.; Donald B. Clark, both of Dayton; Robert G. Bayless, Yellow Springs, all of Ohio

[73] Assignee: The National Cash Register Company, Dayton, Ohio

[22] Filed: July 5, 1972

[21] Appl. No.: 268,996

[52] U.S. Cl. ............ 252/316, 117/62.2, 117/100 A, 117/100 B, 252/314, 252/359 R, 264/4
[51] Int. Cl. ....... B01j 13/02, B01f 5/02, B44d 1/02
[58] Field of Search ............... 252/316, 314, 359 R; 117/100 A; 264/4; 138/42; 259/4, 11, 18, 36, DIG. 24, DIG. 30

[56] References Cited
UNITED STATES PATENTS

| | | | |
|---|---|---|---|
| 3,297,466 | 1/1967 | Herman et al. | 117/100 A X |
| 3,415,758 | 12/1968 | Powell et al. | 252/316 |
| 3,436,355 | 4/1969 | Bakan | 252/316 |

FOREIGN PATENTS OR APPLICATIONS

| | | | |
|---|---|---|---|
| 762,700 | 12/1956 | Great Britain | 264/4 |

*Primary Examiner*—Richard D. Lovering
*Attorney, Agent, or Firm*—E. Frank McKinney; Robert J. Shafer

[57] ABSTRACT

Continuous encapsulation in a liquid capsule manufacturing vehicle by a process of liquid-liquid phase separation is disclosed. The continuous encapsulation is performed in a capsule manufacturing conduit which has a plurality of material introduction ports at spaced positions and a single material exit port and has a substantially constant cross-sectional shape and area throughout its length. Individual components required for encapsulating are continuously fed into the conduit at separate introduction ports and material in the conduit is maintained in turbulent-flow, steady-state, condition and emerges from the material exit port as a dispersion of minute capsules in an aqueous vehicle. The introduction ports comprise reduced-diameter needles intersecting the conduit as turbulence-inducing bends.

6 Claims, 2 Drawing Figures

RESIDUAL AMOUNT OF MANUFACTURING LIQUID ered.
3,816,331

CONTINUOUS ENCAPSULATION AND DEVICE THEREFOR

BACKGROUND OF THE INVENTION

1. Field of the Invention

The present invention pertains to encapsulating processes conducted on a continuous basis and utilizing the phenomenon of liquid-liquid phase separation as the encapsulating mechanism. The present invention also relates to an apparatus for conducting the continuous encapsulating process. The continuous encapsulating process of this invention more particularly pertains to a method for rapidly manufacturing minute capsules of uniform size at a constant rate. A preferred embodiment of the process of this invention specifically pertains to a process for continuous encapsulating by use of a liquid-liquid phase separation to contain intended capsule core materials substantially insoluble in the manufacturing vehicle. The apparatus of the present invention includes a conduit having a plurality of material introduction ports and a single material exit port. A preferred embodiment of the apparatus of this invention specifically relates to the continuous introduction of individual components of an aqueous encapsulating system at separate introduction ports along the conduit, wherein each of the introduction ports comprise a turbulence-inducing bend in the conduit and an addition thereinto through a hollow needle.

2. Description of the Prior Art

The prior art has taught encapsulating processes of a batch nature using liquid-liquid phase separation. U.S. Pat. Nos. 2,800,457 and 2,800,458 issued July 23, 1957 on the applications of B. K. Green and L. Schleicher and of B. K. Green, respectively, disclose such processes in an aqueous system wherein a preferred capsule wall material is gelatin and the material inducing phase separation is another hydrophilic polymeric material or a water soluble salt. Now abandoned, U.S. Pat. application Ser. No. 701,124 filed Jan. 29, 1968 on the application of R. G. Bayless and D. D. Emrick discloses another process for manufacturing minute capsules in a batch-wise manner using aqueous liquid-liquid phase separation.

U.S. Pat. No. 3,155,590 issued Nov. 3, 1964 on the application of R. E. Miller and J. L. Anderson discloses an encapsulating process of cyclic nature where various components of a liquid-liquid phase separating system are replenished batch-by-batch after completion of each encapsulating procedure. There are none of the aspects of a truly continuous process disclosed in the above-identified patents;—all of these processes requiring periodic addition of components and removal of capsule product and spent manufacturing vehicle and none exhibiting steady-state flow conditions.

A continuous encapsulation process has been disclosed in U.S. Pat. No. 3,464,926 issued Sept. 2, 1969 on the application of J. E. Vandegaer et al. The process therein disclosed requires interfacial polymerization as the means for developing a capsule wall. One of two reactive components is carried in each of the materials to be encapsulated and the surrounding capsule manufacturing vehicle. Moreover, the capsules manufactured therein are required to have a velocity relative to the manufacturing vehicle. Success of the interfacial encapsulation requires a density gradient adequate to permit movement of intended capsule cores through the manufacturing vehicle without pumping the vehicle while, at the same time, maintaining laminar flow of the vehicle.

U.S. Pat. Nos. 3,015,128 and 3,310,612 issued Jan. 2, 1967 and Mar. 21, 1967, respectively, on applications of G. R. Somerville, Jr., disclose mechanical methods for continuous encapsulation requiring impingement of intended capsule cores on hardenable films of polymeric capsule wall material.

SUMMARY OF THE INVENTION

The present invention comprises a tubular encapsulating conduit having a plurality of material introduction ports and a single material exit port in which conduit a continuous encapsulating process is performed. The preferred encapsulating system of this process includes a polymeric material for use as capsule wall and a liquid-liquid-phase-separation-inducing material for causing phase separation and deposit of the capsule wall. The component materials of the system are present in a liquid solvent vehicle which solvent is capable of dissolving any of the component materials individually but which exists as a common solvent between separate liquid phases when the component materials are combined. The material to be encapsulated is substantially insoluble in the solvent and in other components of the system and, of course, cannot be reactive with any of the components. In practice of the invention, the material to be encapsulated is intimately combined with the encapsulating system in the course of sequential addition of encapsulating components along the length of the conduit. The additions are made by means of reduced-diameter needles which intersect the conduit at turbulence-inducing bends. The encapsulating system, at a time when addition is completed, is a three-phase fluid comprising a major amount of a continuous liquid vehicle relatively concentrated in liquid-liquid-phase-separation-inducing material, a minor amount of a dispersion of mobile, liquid, globules relatively concentrated in polymeric capsule wall material and a minor amount of finely-divided or dispersed intended capsule core material. The system, after all additions, contains all materials which are required to manufacture capsules and must only be processed through a proper temperature cycle under appropriate conditions of flow in order to complete the encapsulation.

The encapsulating conduit of this invention is a completely closed tubular system of substantially constant cross-section along its length. The conduit has a plurality of material introduction ports at spaced positions and a material exit port at the other end. A pumping means is applied at each introduction port to the conduit for transporting the material components from the introduction ports, along the conduit, to the exit end; and temperature controlling means are established along the conduit at appropriate locations for achieving an encapsulation using any particular encapsulating system of materials.

The encapsulating components are introduced into the conduit under conditions wherein the separated phase of capsule wall material is initially liquid. During the course of operation, conditions along the conduit, at any chosen location, are maintained constant. (To be more completely explained hereinbelow). Temperature gradients along the conduit are maintained such that the incoming liquid, separated phase of capsule wall material, is rendered more viscous, enwraps dispersed intended capsule core materials and is finally solidified or gelled to yield capsules having self-supporting walls of the polymeric capsule wall material.

In prior art processes, batch encapsulation using similar systems of components was also achieved by changes in temperature of the system. An important difference between the batch processes of the prior art and the continuous process of the present invention resides in the time required to complete encapsulation. The batch processes utilizing liquid-liquid phase separation require encapsulation processing times in the order of hours and encapsulation in the present invention is completed in a few minutes and, in some cases, in a matter of seconds. The continuous process, once begun and established in equilibrium, needs only to be continually supplied with component materials; and capsule manufacture can be conducted for an indefinitely long period of time without shut-down of operation or change-over of apparatus. Batch processes require variation in system conditions as a function of time and also require addition of materials to the system and transfer of the system from vessel to vessel as encapsulation proceeds.

Turbulence and steady-state fluid flow are two important considerations in practice of the present invention which serve to distinguish the continuous encapsulation from the batch-wise encapsulation of the prior art using liquid-liquid phase separation. Flow in the conduit is substantially uniformly turbulent at any given cross-section of the conduit. Such turbulent flow, established all along the encapsulating conduit, subjects each particle of intended capsule core material to similar forces at a given incremental position and supplies dispersing energies to each bit of the material such that the material is dispersed in a narrow range of particle sizes. Turbulence is assured in the device of this invention by use of induction tees through which all of the encapsulating fluids are forced. The induction tees are constructed such that the main stream of encapsulating liquid is forced through a turbulence-inducing bend greater than about 45° and the material to be added is injected into the stream through a reduced-diameter needle positioned in the main stream at the exit end of the bend. It is noteworthy that batch-wise encapsulating processes utilize agitating forces in large vessels such that at some locations there is very high-shear, turbulent, agitating force and at other locations, at the same time, in the same vessel, there are laminar flow conditions.

Encapsulating processes which rely on wetting and enwrapping of one material with another material while both materials are suspended in a liquid vehicle, are particularly subject to the shearing forces associated with the different materials in fluid flow. The capsule manufacturing vehicle must exist in a state of turbulence to prevent agglomeration of embryonic capsules as they are formed; and yet the embryonic capsule itself must move with the manufacturing vehicle under conditions of laminar flow. Laminar flow is required to prevent loss of ungelled capsule walls by excessive shearing forces of the manufacturing vehicle against the embryonic capsules.

A convenient method for obtaining an indication of the degree of turbulence in flow through the device of this invention is determination of a dimensionless engineering value, termed the Reynolds Number. It has been determined that turbulent flow in the device of this invention occurs at a Reynolds Number of greater than about 2,000, most probably at about 4,000 and certainly at less than 10,000;—the exact Reynolds Number at which turbulence occurs being rather difficult to ascertain. Reynolds Number is designated by R in the following equation:

$R = DV\rho/\mu$ wherein $D$ is a characteristic length associated with the system, such as the diameter of a capsule or the diameter of the conduit; $V$ is a characteristic velocity of the system such as the velocity of an individual capsule or of a cross-section front of the vehicle moving through the conduit; $\rho$ is the density of the flowing material and $\mu$ is the viscosity of the fluid being observed, such as the viscosity of the ungelled capsule wall or the viscosity of the manufacturing vehicle. For practical purposes, the velocity of the capsules can be taken to be very nearly the same as the velocity of the vehicle flowing through the conduit, that is, there is very little, if any, relative motion between the capsules and the vehicle. Also, the density of the capsule can be taken to be nearly equal with the density of the vehicle. The Reynolds Number must be calculated using a consistent system of dimensions such as grams-centimeters-seconds.

In preferred practice of this invention, the Reynolds Number for flow of the liquid with respect to the conduit is maintained at greater than 4,000 (turbulent flow of the liquid) and the Reynolds Number for movement of the capsules with respect to the conduit is maintained at less than 4,000 (non-turbulent movement of the capsules). That these conditions of turbulence can be maintained, is determined by observing that $D$, the characteristic length of the Reynolds Number formula, can be more than 1,000 times greater for the conduit than for the capsule. In continuous encapsulation through a conduit, there is a substantially constant degree of turbulence as compared to the inconstant degree of turbulence which can be accomplished in a batch-wise vessel as above-described.

Continuous encapsulation through a conduit is characterized by steady-state flow conditions in the capsule manufacturing liquid. Steady-state flow is defined as a condition of flow wherein the characteristics of a system, at any given location, are constant and unchanging as a function of time. In other words, a system under steady-state flow conditions has attained an equilibrium of conditions. In the present invention, conditions along the length of the conduit vary; but at any given cross-section location in the conduit, conditions remain constant. Thus, once conditions are established, they are maintained constant. The flow-rate, material concentrations, temperatures and other parameters are carefully controlled to maintain conditions such that material components are sequentially introduced into the conduit and capsules emerge from the conduit at a constant rate.

Encapsulating systems eligible for use in the present invention include systems using liquid-liquid phase separation as the capsule forming mechanism. Preferred, are such liquid-liquid phase-separating systems which utilize aqueous manufacturing vehicles. Aqueous systems include systems which require cooling for solidification or gelation of the capsule wall material and systems wherein the liquid capsule walls, once deposited, are heated for solidification. Examples of materials eligible for use in such aqueous encapsulating systems are: unmodified acid- or alkali-precursor gelatins; modified gelatins such as succinylated gelatin; gum arabic; carrageenan; hydrolyzed poly(methylvinylether-co-maleic anhydride); hydrolized poly(ethylvinylether-co-maleic anhydride); poly(vinyl alcohol); poly(vinylpyrrolidone); poly(acrylic acid) and its salts; poly(methacrylic acid) and its salts; hydrolyzed poly(ethylene-co-maleic anhydride); melamine/formaldehyde resin; cationic starch; zein; poly(ethylene oxide); methylated methylol melamine; albumin and the like. Various reactant materials can be included in the encapsulating system to afford reactive means for solidifying the capsule wall materials. Such materials include: resorcinol, hydroquinone, catechol, phloroglucinol, pyrogallol, guaiacol, gallic acid, digallic acid, tannic acid, cresols, chlorophenols, xylenols, eugenol, isoeugenol, saligenin, thymol, hydroxyacetophenone, hydroxybiphenyls, bisphenol A, cashew nut oil phenols, formaldehyde, glyoxal, furfural, glutaraldehyde and the like and other materials reactive with the capsule wall materials, such as, inorganic metal salts in aqueous solution.

Capsule internal phase material in capsules of the present invention can be any of a multitude of different kinds and types of materials. The most important criteria in selection of the materials which are eligible for use as the internal phase of capsules are: (a) that the intended internal phase material be substantially insoluble in the manufacturing vehicle and (b) that the intended capsule internal phase material be substantially non-reactive with other components of the capsule or coacervate film manufacturing system. A few of the materials which can, for example, be utilized as capsule internal phases in a system using an aqueous vehicle include, among a multitude of others: water insoluble or substantially water insoluble liquids, such as olive oil, fish oils, vegetable oils, sperm oil, mineral oil, xylene, toluene, benzene, kerosene, chlorinated biphenyl, and methyl salicylate; substantially water insoluble metallic oxides, sulfides and salts; fibrous materials, such as cellulose or asbestos; substantially water insoluble synthetic polymeric materials, liquid or solid, including plastisols, organosols and polymerizable compounds; minerals; pigments; glasses; elemental materials, including solids, liquids and gases; flavors; fragrances; reactants; biocidal compositions; physiological compositions; fertilizer compositions, and the like. In a similar manner, materials insoluble in non-aqueous vehicles can be encapsulated in systems using those vehicles. In short, the materials which can be contained in capsules manufactured by the process of the present invention can differ not only among themselves in their physical state, which can be solid, liquid, gas, or combinations thereof, but can differ in their chemical composition and in their intended use. The capsule wall materials provide protection for the capsule internal phase materials, such as, protection from ambient conditions, protection from oxidation or ultraviolet radiation, protection from sublimation or evaporation, from crystallization in solution, and the like.

Examples of other systems eligible in practice of this invention are non-aqueous systems utilizing liquid-liquid phase separation of such capsule wall materials as: ethyl cellulose; cellulose nitrate; cellulose acetate phthalate; polymethylmethacrylate; acrylonitrile-styrene copolymer; polystyrene; vinylidene chloride-acrylonitrile copolymer; epoxy resin; polyvinyl-formal; and the like. Examples of phase separation inducing agents eligible for use herein include: polybutadiene; siloxane polymers; methacrylate polymers; mineral oils; vegetable oils; and the like.

Capsules made according to the process of the present invention are substantially spherical, have seamless walls, and are not limited as to size or as to internal phase contents. The broad range of internal phase contents was hereinabove disclosed and the size range of capsules made by the present invention can extend from a lower limit of a few to several microns up to a large limit of a few hundred microns or perhaps slightly larger. The usual size for capsules made according to the present process is from one or two microns to about 200 microns in average diameter. Capsules of the aforementioned size are considered to be minute and are preferred. Capsules made according to the present invention can be made to contain a range of amounts of internal phase material. The capsules can contain from zero to more than 99 percent, by weight, of an internal phase material. The most usual and preferred range for the amount of material to be contained in capsules manufactured according to the present invention is from about 50 to about 97 percent, by weight. Also, capsules can be manufactured containing releasable or evaporable material which, on isolation, empty and yield hollow shells of capsule wall material. Under proper conditions, gas bubbles can be pumped through the conduit and encapsulated by the present process to yield hollow shells of capsule wall material.

Figure 1:
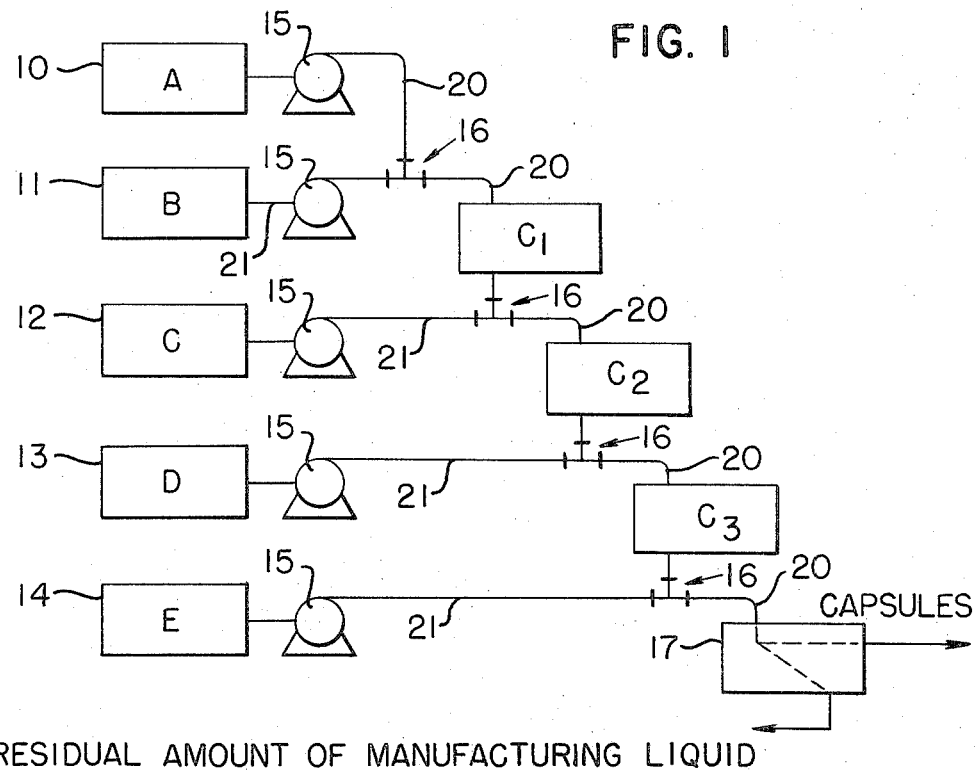
FIG. 1 is a schematic flow-diagram representation of the process and the apparatus of the present invention.

Now referring to FIG. 1, individual components required in the present encapsulation process are continuously fed by pumping means (15) from a supply tank (10 through 14), through an additive stream tube (21), into an induction tee (16) and directly into the main stream tube (20). It is important to note that the main stream tube (20) undergoes several turbulence-inducing bends during its course through the device. Materials in the main stream tube (20) are maintained under temperature control either in a series of stepwise temperature progressions ($C_1, C_2, C_3, \ldots$) or the temperature conditions can be maintained in a continuous and gradual temperature change pattern in some particular portion of the main stream tube (20) or the temperature can be maintained constant throughout the system. If required or desired for some particular purpose, temperature can also be controlled in the additive stream tubes (21).

The encapsulating system comprises several components which are sequentially added to a main body of flow. The initial flow, from the first supply vessel (10), begins the flow in the main stream tube (20). After the initial flow is commenced, as many additional supply vessels (11-14) can be used as are required in a particular encapsulating system. As more components are added to the stream, effective mixing to substantial homogeneity is ensured by means of the induction tees. After passage through the final induction tee (16) the encapsulating system—now containing capsules—flows into a capsule separating vessel (17) to yield capsules and residual manufacturing liquid.

If required or desired, as an adjunct to the present process, the ambient environmental pressure in which the encapsulation is conducted can be either above or below atmospheric pressure. Such might be useful, for example, to encapsulate very volatile liquids under greater-than-atmospheric pressure in order to minimize loss of the material by evaporation or to supply a material in internally pressurized capsules. Encapsulation under less-than-atmospheric pressure may be useful, for example, to ensure that liquids to be encapsulated are not contaminated by dissolved gases.

Figure 2:
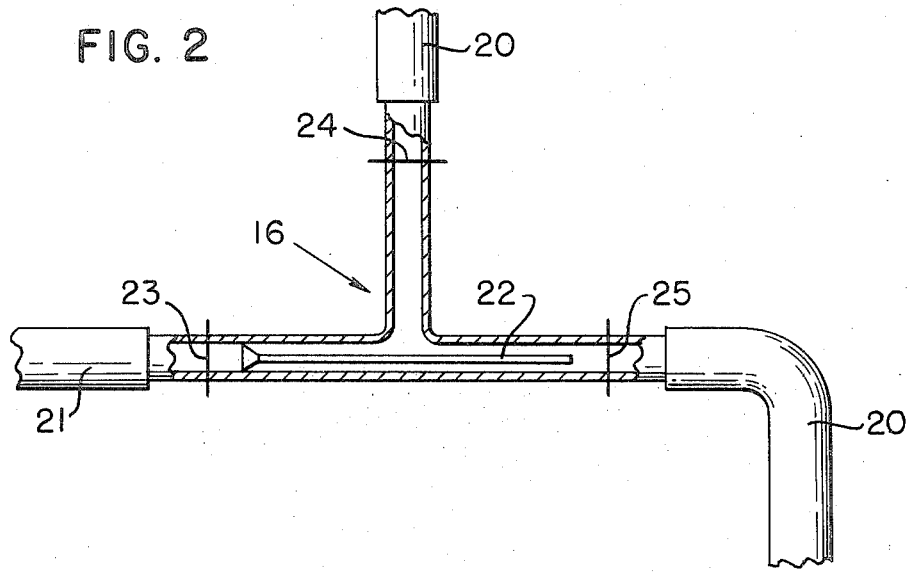
FIG. 2 is a schematic representation of the induction tee used in the apparatus of this invention to ensure turbulent flow in mixing of components.

FIG. 2 is a representation of the induction tee (16) of this invention said tee having a cross-bar and a leg. The cross-bar (horizontal in the drawing) of the tee admits of an additive entrance (23) to which is connected an additive stream tube (21) and a main stream exit (25) to which the main stream tube (20) is connected. The leg of the tee is the main stream entrance (24) and has the main stream tube (20) connected thereto. A hollow needle (22) is mounted in the cross-bar concentric with the tube and one end (the inlet end) of the needle is sealed therewith at the additive entrance (23). The needle (22) extends beyond the intersection of the leg of the tee with the cross-bar but ends before the main stream exit (25). Moreover, concentricity of the needle with the conduit is required only at the exit end of the needle. With respect to relative diameters of the various tubes and of the needle, it should be noted that the tubes of the induction tee are of substantially circular and constant cross-section and that the entrances and the exit are substantially the same size. The needle (22) has an internal diameter ranging from about 10 percent to about 50 percent of the internal diameter of the main stream exit (25). Flow into the tee is constituted by introduction of the main stream through the main stream entrance (24) and introduction of the additive stream at the additive entrance (23) through the needle (22). The incoming main stream undergoes a turbulence-producing bend greater than about 45° and just beyond the bend, the additive stream combines with the main stream at the mouth of the needle (22). That combination of materials emerges from the tee at the main stream exit (25) and continues on in the main stream tube (20).

DESCRIPTION OF PREFERRED EMBODIMENT

All parts and percents are by weight, unless specified otherwise.

In present practice of the invention, the main and additive stream tubes are preferredly about five-sixteenths inch in internal diameter; the induction tees have an internal diameter of about one-fourth inch and the needle in the tees has an internal diameter of about 0.061 inches. (In the encapsulating device of this example, the needles used are 14 gage hypodermic needles.) The device is arranged substantially similar to the device portrayed in FIG. 1. Four supply vessels are used, each connected to an induction tee through an additive stream tube with a pumping means. The additive stream tubes can be any reasonable length and are usually more than about 2 but less than about 10 feet. The main stream tube is interrupted at intervals by the induction tees and the intervals can be any reasonable length—usually more than about 2 but less than about 10 feet. The section of main stream tube between the final induction tee and the capsule separating vessel is sometimes of a rather extended length, even on the order of 15–20 feet, and is believed to afford some amount of reduced turbulence just prior to entry into the capsule separating vessel. It is believed that a total conduit length of more than about 10 feet is required for successful operation of the device.

The pumping means for this example is selected to yield an overall flow rate of about 15–20 milliliters per second. In general, the conduit dimensions are selected as a function of the encapsulating system to be used and in accordance with the requisite volume of capsule production. The tube diameters can be varied over a large range extending from about one-sixteenth inch in diameter to one-half inch or more and, perhaps up to about one inch in diameter. The internal diameter of needles used in the induction tees can also be varied over a wide range including about 0.01 inch to about 0.20 inch. An important design consideration for the induction tee is the ratio of internal diameters of the tee tubing to the needle. This example utilizes a ratio of about 4. A range of preferred ratios extends from about 2 to about 10;—3 to 8 being most preferred and believed to operate in the most acceptable manner.

This example utilizes four different solutions; (1) a capsule wall material; (2) a capsule internal phase solution; (3) a phase-separation inducing solution; and (4) a capsule wall hardening solution.

Capsule Wall Material Solution — The following materials are dissolved in 50,000 grams of water:
 682 g gum arabic
 610 g urea
 726 g resorcinol
 490 g poly(vinyl alcohol).

The poly(vinyl alcohol) used in this example is sometimes a combination of products and preferred hereinabove is about 400 g of partially hydrolyzed poly(vinyl alcohol) and about 90 g of highly hydrolyzed poly(vinyl alcohol). The highly hydrolyzed poly(vinyl alcohol) is about 99 to 100 percent hydrolyzed and is exemplified by a material designated as Elvanol 71–30 (trademark) sold by E. I. du Pont de Nemours and Co., Wilmington, Del., United States of America, having a molecular weight of about 86,000 and a viscosity of about 28 to 32 centipoises in a 4 percent, by weight, aqueous solution at 20° centigrade. The partially hydrolyzed poly(vinyl alcohol) is about 87 to 89 percent hydrolyzed and is exemplified by a material designated as Elvanol 50–42 (trademark) sold by E. I. du Pont de Nemours and Co., having a molecular weight of about 125,000 and a viscosity of about 35 to 45 centipoises in a 4 percent, by weight, aqueous solution at 20° centigrade.

Capsule Internal Phase Solution — Any substantially water insoluble material can be used. In this example a paraffin oil is used and if desired or required an oil soluble dye can be added to the oil to facilitate observation of the encapsulation process. An example of a suitable paraffin oil is Sunthene 430 (trademark), a naphthenic oil, having a density of about 0.920 grams per milliliter, a molecular weight of 340 and described specifically at page 5 of Sunoco Technical Bulletin No. 93 published October, 1968 and distributed by The Sun Oil Company, Philadelphia, Pa., U.S. of A;—the vendor of the oil.

Phase-Separation-Inducing Solution — This solution causes and maintains a separated phase of poly(vinyl alcohol)/resorcinol capsule wall material and can be any of several water soluble salts well-known for this purpose. A two percent, by weight, aqueous solution of sodium sulfate is used in the present example.

Capsule Wall Hardening Solution — This solution causes a water-insolubilizing chemical reaction with the capsule wall material and is added after the capsule wall material has been phase separated. The hardening solution for this example comprises 1,100 milliliters concentrated sulfuric acid, 6,500 milliliters formalin (37 percent, by weight, aqueous formaldehyde solution) and 10,000 milliliters water.

Capsule Manufacture — The solutions are placed in appropriate supply vessels. No temperature controls are applied;—this encapsulating system operating optimally at about 20°–25° centigrade. Flow of the capsule wall material solution is commenced from the first supply vessel and is adjusted to about 10.6 milliliters per second. Then flow of the capsule internal phase is commenced and set at a rate of about 1.8 milliliters per second. The sodium sulfate solution is added to the stream at a rate of about 1.2 milliliters per second and the entire stream is, optionally, run through an emulsifying pump from which emerges internal phase droplets in a size range of about 20–30 microns said droplets covered by a liquid, separated phase of capsule wall material to yield embryonic capsules. The hardening solution is then added to the main stream at a rate of about 2.0 milliliters per second and the main stream emerges containing completed capsules of the oil enwrapped by water-insolubilized poly(vinyl alcohol) material. The exit flow rate is about 15.6 milliliters per second and, if desired, the entire main stream can be used in a coating process whereby the stream is directed onto a surface to be coated and the stream is then dried to leave a residue of capsules. The above encapsulating system utilizes a chemical reaction as capsule wall hardening means and requires no particular temperature control.

A system requiring temperature control can be described by combining flow of 3 parts of about 3.6 percent aqueous solution of acid-extracted (isoelectric point, pH 8–9) porkskin gelatin with flow of 2 parts of about 5.5 percent aqueous solution of gum arabic to achieve liquid-liquid phase separation of a complex coacervate. The temperature of the main stream should be maintained at greater than 35° centigrade and the temperature of the additive gelatin solution must be maintained at above the gelatin temperature. About 1.5 parts of substantially water insoluble internal phase material is then added to the main stream and the main stream is directed through a heat exchanger which lowers the temperature to below about 30° centigrade. Capsules having gelled walls emerge from the heat exchanger and the stream can then either be sent to the capsule separating vessel for chilling or a capsule-hardening solution can be added to the main stream.

The continuous encapsulating device of this invention can also be used for hydrophobic encapsulating systems wherein water-soluble capsule internal phase materials are enclosed by water insoluble polymers. A system of hydrophobic materials for encapsulating by means of water insoluble capsule wall materials can be described by combining flow of 12 parts of about 2 percent solution, in toluene, trichloroethylene, or tetrachloroethylene, of a particular poly(ethylene-co-vinyl acetate), described below, with flow of 1 part of cottonseed oil. The poly(ethylene-co-vinyl acetate) is capsule wall material, the cottonseed oil is phase separation inducing material and this resulting main flow is established at about 75° to 80° centigrade. About 1–2 parts of insoluble internal phase material (such as, for example, glycerol) is then added to the main stream and the main stream is directed through a heat exchanger which lowers the temperature to about 20° centigrade. Capsules having solidified walls emerge from the heat exchanger and the stream can either be sent to the capsule separating vessel or a capsule hardening solution can be added to the main stream. Appropriate capsule hardening materials are toluene diisocyanate or oxalyl chloride. The poly(ethylene-co-vinyl acetate) material of this example is partially hydrolyzed to the extent of about 50 to 53 percent of the available acetate groups (E. I. du Pont de Nemours & Co., Inc., Wilmington, Del., U.S.A. under the trademark designation, Elvon PB–7802 hydroxyvinyl resin). Other features of the materials eligible for use in this example of encapsulation can be found in U.S. Pat. No. 3,674,704 issued to the assignee herein on July 4, 1972.

What is claimed is:

1. A process for continuously manufacturing minute capsules in a liquid capsule manufacturing vehicle in a closed capsule manufacturing conduit having a plurality of spaced-apart material introduction ports and only a single material exit port comprising the steps of:
   a. introducing a solution of polymeric capsule wall material in turbulent, steady-state, flow into the capsule manufacturing conduit at a first material introduction port;
   b. introducing intended capsule core material, substantially insoluble in the solvent of the solution, at a second material introduction port into the solution of capsule wall material in the conduit;
   c. introducing phase-separation-inducing material at a third material introduction port into the solution of (a) and the capsule core material of (b) in the conduit to yield a substantially homogeneous mixture;
   d. conducting the substantially homogeneous mixture through the conduit in steady-state flow at a rate such that: (i) $DV\rho/\mu$ is greater than 4,000 where $D$ is the conduit diameter, $V$ is the velocity of a cross-section front of the vehicle moving through the conduit, $\rho$ is the density of the vehicle and $\mu$ is the viscosity of the vehicle; and (ii) $DV\rho/\mu$ is less than 4,000 where $D$ is the capsule diameter, $V$ is the velocity of an individual capsule moving through the conduit, $\rho$ is the density of the capsules and $\mu$ is the viscosity of the ungelled capsule wall;
   e. maintaining conditions along the conduit to yield self-supporting capsule wall material enwrapping the intended capsule cores.

2. The process of claim 1 wherein the solution is aqueous.

3. The process of claim 1 wherein the solution utilizes organic solvent.

4. The process of claim 1 wherein there is the additional step of: introducing capsule wall hardening material into the solution of (a), the capsule core material of (b) and the phase-separation-inducing material of (c).

5. A device for continuously manufacturing minute capsules, in operation, comprising:
   a. a capsule manufacturing conduit having a plurality of spaced-apart material introduction ports and only a single exit port and having introduced sequentially along the conduit and flowing therethrough in a turbulent, steady-state manner, an aqueous solution of polymeric capsule wall material, substantially water insoluble intended capsule core material and liquid-liquid phase separation-inducing material to yield an intimate mixture of encapsulating components, wherein the introduction ports each comprise a tee with a cross-bar and a leg positioned to yield a bend in the conduit of greater than 45° to enhance turbulent flow, an incoming main stream being conducted into the leg, an exiting main stream being conducted out one end of the cross-bar, and a reduced-diameter induction needle for introduction of each capsule manufacturing component located concentric with the other end of the cross-bar, extending inward to just beyond the bend in the conduit and with an incoming additive stream being conducted through the needle and into the turbulent main stream; and b. pumping means operatively attached to the conduit and maintaining substantially steady-state flow in the conduit at a rate such that: (i) $DV\rho/\mu$ is greater than 4,000 where $D$ is the conduit diameter, $V$ is the velocity of a cross-section front of the vehicle moving through the conduit, $\rho$ is the density of the vehicle and $\mu$ is the viscosity of the vehicle; and (ii) $DV\rho/\mu$ is less than 4,000 where $D$ is the capsule diameter, $V$ is the velocity of an individual capsule moving through the conduit, $\rho$ is the density of the capsules and $\mu$ is the viscosity of the ungelled capsule wall; whereby the intimate mixture is conducted through the conduit and minute capsules leave the conduit and at any given cross-sectional location in the conduit the conditions are constant as a function of time.

6. A device for continuously manufacturing minute capsules at a rapid rate in a liquid capsule manufacturing vehicle comprising:

a. a closed conduit having a plurality of sequentially spaced introduction ports to receive components of an encapsulating system and an exit port for release of capsules and the vehicle, said conduit having a length of more than 10 feet, an inside diameter of less than 1 inch and a substantially constant cross-section, wherein the introduction ports each comprise a tee with a cross-bar and a leg positioned to yield a bend in the conduit of greater than 45° to enhance turbulent flow, an incoming main stream being conducted into the leg, an exiting main stream being conducted out one end of the cross-bar, and a reduced-diameter induction needle for introduction of each capsule manufacturing component located concentric with the other end of the cross-bar, extending inward to just beyond the bends in the conduit and with an incoming additive stream being conducted through the needle and into the turbulent main stream; and b. pumping means sealed to ports of the conduit to maintain substantially turbulent flows and substantially steady-state conditions in the conduit such that: (i) $DV\rho/\mu$ is greater than 4,000 where $D$ is the conduit diameter, $V$ is the velocity of a cross-section front of the vehicle moving through the conduit, $\rho$ is the density of the vehicle and $\mu$ is the viscosity of the vehicle; and (ii) $DV\rho/\mu$ is less than 4,000 where $D$ is the capsule diameter, $V$ is the velocity of an individual capsule moving through the conduit, $\rho$ is the density of the capsules and $\mu$ is the viscosity of the ungelled capsule wall.

* * * * *